May 11, 1943.        S. S. ANDERSON        2,319,101
BOTTLE CONSTRUCTION WITH TEMPERATURE INDICATOR
Filed June 18, 1941
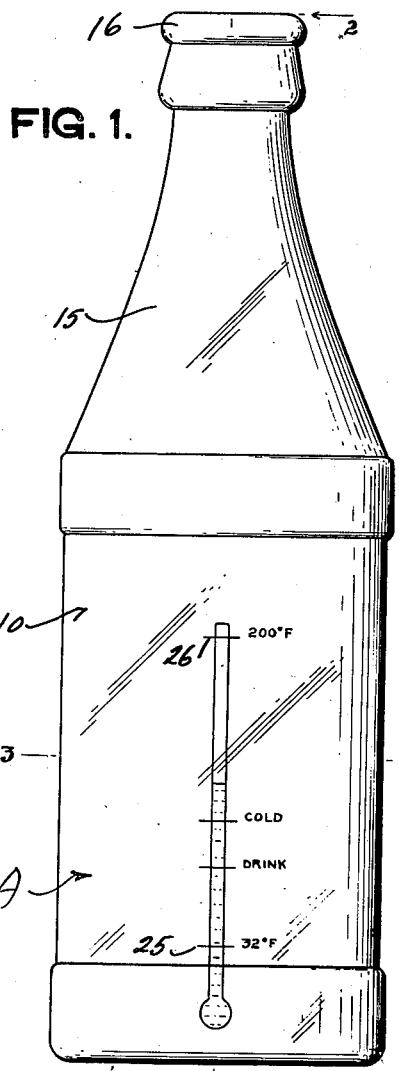
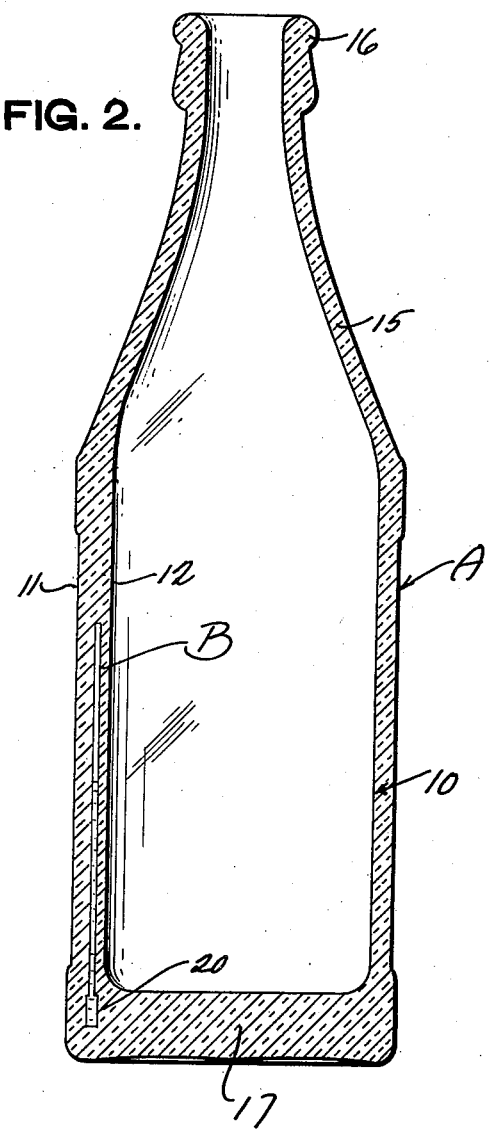
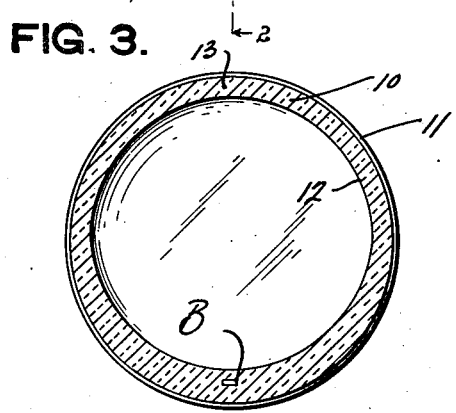
INVENTOR.
Sidney S. Anderson
BY Lancaster, Allwine & Rommel
ATTORNEYS.

Patented May 11, 1943

2,319,101

UNITED STATES PATENT OFFICE 2,319,101

BOTTLE CONSTRUCTION WITH TEMPERATURE INDICATOR

Sidney S. Anderson, Hattiesburg, Miss.

Application June 18, 1941, Serial No. 398,660

5 Claims. (Cl. 73—343)

This invention relates to improvements in bottle constructions.

The primary object of this invention is the provision of an improved bottle which has a thermometer built in as part of the construction thereof, for designating the temperature of the contents of the bottle.

A further object of this invention is the provision of an improved bottle which has a thermometer built in as part of the construction of the bottle for designating the temperature of the contents of the bottle; the bottle being so constructed in relation to the thermometer that the bottle will be properly reinforced notwithstanding the fabrication of the thermometer in a wall of the bottle.

A further object of this invention is the provision of a bottle construction of the general type used for the vending of beverages, such as soft drinks, which is provided with a thermometer built in as part of the wall structure of the bottle, for designating to a user the temperature of the contents of the bottle.

A further object of this invention is the provision of an improved bottle adapted to receive materials under pressure; having a thermometer built into the wall structure of the bottle in such manner that the wall structure will not be weakened, and will be capable of withstanding the desired pressures.

A further object of this invention is the provision of a thermometer associated in the wall structure of a bottle in such manner as to provide for a well reinforced wall structure without the necessity of adding humps, ridges, or other protrusions upon the inside or outside thereof.

Other objects and advantages of this invention will be apparent during the course of the following detailed description.

In the accompanying drawing, forming a part of this specification, and wherein similar reference characters designate corresponding parts throughout the several views, Figure 1 is a side elevation of the improved bottle, showing the thermometer as it will appear to an observer; the outer surface of the bottle having delineations thereon either in degrees, or in other relation to the temperature of the contents of the bottle.

Figure 2 is a vertical cross sectional view taken through the construction of the bottle, substantially on the line 2—2 of Figure 1, and showing the built-in relation of the thermometer with the wall structure of the bottle.

Figure 3 is a transverse sectional view taken substantially on the line 3—3 of Figure 1, and showing the variable thickness of the side wall of the bottle so as to provide a wall structure which does not have weak spots, and which may receive the thermometer in a built-in relation therewith.

In the drawing, wherein for the purpose of illustration is shown only a preferred embodiment of the invention, the letter "A" may generally designate the improved bottle, which has a thermometer "B" built in the wall structure as a part thereof.

While the bottle "A" is of the general shape used for the vending of beverages, such as soft drinks, it is within the purpose of this invention to provide a bottle or glass receptacle which may receive toxins, medicines, or other material. The bottle preferably includes a cylindrical shaped side wall construction 10, the outer surface 11 of which is struck from a center eccentric with respect to the center of the inside surface 12 of the bottle, so that the thickness of the wall construction 10 is least at a location 12 diametrically opposed from the thermometer "B," and therefrom gradually and uniformly increased in thickness to the point where the thermometer "B" is located. This arrangement properly reinforces the bottle, and prevents any weak spots in the wall structure of the bottle. That fact is important when it is considered that the bottle is adapted to receive beverages and other materials under superatmospheric pressure. The neck 15 of the bottle tapers upwardly and is provided with a top construction 16 adapted to receive either a crown cap or screw threaded cap. The bottom wall 17 of the bottle is at least twice the dimension of the thickness of the wall structure 10 of the bottle at the location of the thermometer "B."

The thermometer "B" is vertically positioned in the wall construction 10 of the bottle, closer to the inside surface 12 than the external surface 11, as shown in Figures 2 and 3 of the drawing. It is noted that the bulb portion 20 of the thermometer, which receives the fluid, is located in the thick bottom wall construction 17 of the bottle. This is important, not only in that the thermometer will there accurately register the contents of the bottle rather than external temperatures, but also because of the protection afforded by the thickness of the bottle at this location. This arrangement of the bottle construction is also important when we consider the method of constructing the bottle, since the side wall structures of bottles are first fabricated and then the bottom wall construction.

In relation to the thermometer "B" the external surface 11 of the bottle is provided with delineations 25 and 26 designating the degrees in temperature. The limits of temperature designation may vary, although it is believed that the delineation 25 may designate freezing temperature and the delineation 26 may designate a maximum temperature below boiling, or even slightly thereabove if desired.

The thermometer fluid may be alcohol, mercury, or any other desired fluid which will expand and register in a visual relation the temperature of the contents of the bottle.

It is to be particularly noted that I have provided a combined bottle and thermometer construction, in which the latter is so associated in the wall structure that the bottle may be manufactured in quantity production with but little more expense than manufacture of conventional bottles. It is to be particularly noted that there are no humps, or other protrusions upon either the inside or the outside of the bottle.

Various changes in the shape, size and arrangement of parts may be made to the form of invention herein shown and described, without departing from the spirit of the invention or the scope of the claims.

I claim:

1. As an article of manufacture a bottle having a side wall construction, a thermometer built in the side wall construction; the thickness of the side wall construction varying in uniformly increasing thickness from a point opposite the thermometer to the location of the thermometer where said side wall thickness of the bottle is greatest.

2. As an article of manufacture a bottle having a side wall construction, a thermometer built in the side wall construction; the thickness of the side wall construction varying in uniformly increasing thickness from a point opposite the thermometer to the location of the thermometer where said side wall thickness of the bottle is greatest, the lower temperature receiving end of the thermometer being located in the bottom wall structure of the bottle.

3. As an article of manufacture a bottle having a bottom wall and a side wall construction; the side wall construction of the bottle being of general cylindrical formation; the centers of the inner and outer surfaces of the side wall being eccentric with respect to each other so as to vary the thickness of the side wall construction of the bottle from one side of the bottle to the opposite side thereof, and a thermometer built into the thickest portion of the side wall construction of the bottle and visible externally of the bottle for registering the temperature of the contents of the bottle.

4. As an article of manufacture a bottle having a bottom wall and a general cylindrical side wall construction; the inner and outer surfaces of the side wall construction being eccentrically disposed to uniformly vary the thickness of the side wall construction of the bottle from one side of the bottle to a point diametrically opposite, and a thermometer disposed in upright relation in the thickest portion of the side wall construction of the bottle for registering the temperature of the contents of the bottle, said thermometer being located closer to the inside surface of the bottle than the outside surface.

5. As an article of manufacture a bottle having a bottom wall and a general cylindrical side wall construction; the inner and outer surfaces of the side wall construction being eccentrically disposed to uniformly vary the thickness of the side wall construction of the bottle from one side of the bottle to a point diametrically opposite, and a thermometer disposed in upright relation in the thickest portion of the side wall construction of the bottle for registering the temperature of the contents of the bottle, said thermometer being located closer to the inside surface of the bottle than the outside surface, and the thermometer fluid end of the thermometer being located in the base wall structure of the bottle.

SIDNEY S. ANDERSON.